United States Patent
Kondou et al.

(10) Patent No.: US 7,147,688 B2
(45) Date of Patent: Dec. 12, 2006

(54) ENGINE EXHAUST GAS PURIFICATION DEVICE

(75) Inventors: Terunori Kondou, Yokohama (JP); Junichi Kawashima, Yokosuka (JP); Naoya Tsutsumoto, Yokohama (JP); Takao Inoue, Yokohama (JP); Toshimasa Koga, Yokohama (JP); Makoto Otake, Yokohama (JP)

(73) Assignee: Nissan Motor Co., Ltd., Yokohama (JP)

(*) Notice: Subject to any disclaimer, the term of this patent is extended or adjusted under 35 U.S.C. 154(b) by 345 days.

(21) Appl. No.: 10/774,387

(22) Filed: Feb. 10, 2004

(65) Prior Publication Data

US 2004/0173090 A1    Sep. 9, 2004

(30) Foreign Application Priority Data

Mar. 7, 2003  (JP) ............................ 2003-061585

(51) Int. Cl.
  *B01D 46/00* (2006.01)
  *F01N 3/023* (2006.01)

(52) U.S. Cl. .................... 95/1; 95/19; 95/20; 95/23; 95/273; 95/278; 55/282.2; 55/282.3; 55/385.3; 55/523; 55/524; 55/DIG. 10; 55/DIG. 30; 96/420; 96/421; 96/422; 60/273; 60/297; 60/311

(58) Field of Classification Search ............... 55/282.2, 55/282.3, 385.3, 523, 524, DIG. 16, DIG. 30; 95/1, 15, 19, 20, 23, 277, 278; 96/421, 422, 96/423, 424, 425, 420; 60/274, 273, 277, 60/295, 297, 311
See application file for complete search history.

(56) References Cited

U.S. PATENT DOCUMENTS 5,357,755 A * 10/1994 Gillingham et al. ......... 60/311
5,511,413 A * 4/1996 Pfister et al. ............... 73/118.1
6,758,039 B1 * 7/2004 Kuboshima et al. .......... 60/311
6,907,873 B1 * 6/2005 Hamahata ................... 60/311
6,928,809 B1 * 8/2005 Inoue et al. ................. 60/311
6,941,750 B1 * 9/2005 Boretto et al. ............... 60/311
6,945,037 B1 * 9/2005 Plote et al. .................. 60/311
6,969,413 B1 * 11/2005 Yahata et al. .............. 55/385.3
6,973,778 B1 * 12/2005 Kondou et al. ............... 60/311
6,983,591 B1 * 1/2006 Kondo et al. ................ 60/311
2003/0154710 A1   8/2003 Plote et al.

FOREIGN PATENT DOCUMENTS

DE      199 33 988 A1 * 1/2000
DE      101 00 418 A1    7/2002
JP      60-47937       * 3/1985
JP      61-135917      * 6/1986
JP      6-280544 A      10/1994
JP      7-145722       * 6/1995

* cited by examiner

*Primary Examiner*—Jason M. Greene
(74) *Attorney, Agent, or Firm*—Foley & Lardner LLP

(57) ABSTRACT

A map which defines a relationship of an exhaust gas pressure P2 at the outlet of a filter (13) to a load Q and rotation speed Ne of an engine (1) is prepared, and an exhaust gas pressure P1 at the inlet to the filter (13) is determined from a differential pressure ΔP between the front and rear of the filter and the outlet pressure P2 obtained by referring to the map. The inlet pressure P1 determined in this manner is used to determine an exhaust gas volumetric flow rate Q1, and thus an accurate particulate accumulation SM, which is required to determine the need for regeneration of the filter (13), can be calculated.

11 Claims, 5 Drawing Sheets

ENGINE EXHAUST GAS PURIFICATION DEVICE

TECHNICAL FIELD OF THE INVENTION

This invention relates to a technique for calculating particulate accumulation in a filter which traps the particulate matter contained in engine exhaust gas.

BACKGROUND OF THE INVENTION

In an exhaust gas purification device disclosed in JP6-280544A, published by the Japan Patent Office in 1994, a filter is provided in the engine exhaust system to purge particulate matter (to be referred to as "exhaust particulate" below) discharged from a diesel engine. By oxidizing or incinerating the trapped exhaust particulate at predetermined time intervals, the filter is regenerated.

SUMMARY OF THE INVENTION

During filter regeneration, the exhaust gas temperature is raised by means of engine control, and hence a regeneration timing or regeneration period must be set accurately in accordance with the amount of accumulated particulate. In the prior art described above, particulate accumulation is estimated from the differential pressure between the front and rear of the filter, and regeneration is begun when the accumulation reaches a certain reference value. However, although the differential pressure between the front and rear of the filter is corrected using the exhaust gas temperature and intake air amount in the prior art described above, it is difficult to estimate particulate accumulation accurately.

It is therefore an object of this invention to calculate the accumulation of exhaust particulate trapped in a filter accurately.

In order to achieve above object, this invention provides an exhaust gas purification device having a filter which traps exhaust particulate from an engine, comprising a detection device which detects a differential pressure between the front and rear of the filter; and a controller functioning to determine an operating condition of the engine; calculate an exhaust gas pressure at an outlet of the filter based on the operating condition of the engine; calculate an exhaust gas pressure at an inlet to the filter based on the differential pressure and outlet pressure; calculate an exhaust gas volumetric flow rate based on the inlet pressure; and calculate an amount of particulate accumulated in the filter based on the exhaust gas volumetric flow rate.

The details as well as other features and advantages of this invention are set forth in the remainder of the specification and are shown in the accompanying drawings.

DESCRIPTION OF THE PREFERRED EMBODIMENTS

Figure 1:
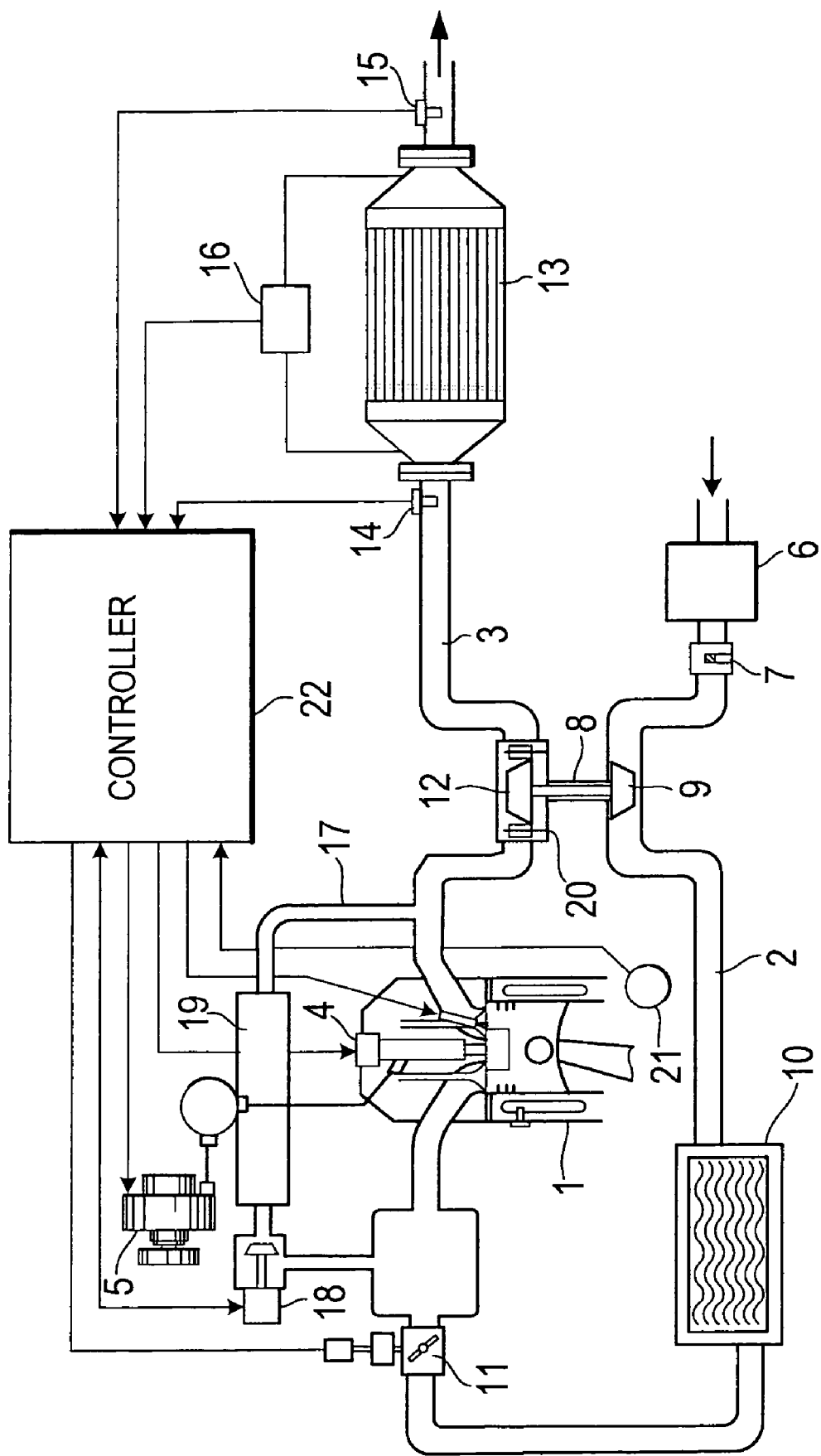
FIG. 1 is a schematic diagram of an engine system to which this invention is applied.

FIG. 1 of the drawings shows an example of an engine system to which this invention is applied.

A fuel injection valve 4 and a fuel injection pump 5 are installed in an engine 1. An air cleaner 6, an airflow meter 7, a compressor 9 of an exhaust turbocharger 8, an inter cooler 10, and a throttle valve 11 are interposed on an intake passage 2 of the engine 1 in succession from the upstream side thereof. A turbine 12 of the exhaust turbocharger 8 and a filter (DPF) 13 for trapping exhaust particulate are interposed on an exhaust passage 3 of the engine 1 in succession from the upstream side thereof.

The inlet temperature and outlet temperature of the filter 13 are detected by temperature sensors 14, 15 attached upstream and downstream of the filter 13 respectively. A differential pressure ($\Delta P$) between the front and rear of the filter 13 is detected by a differential pressure sensor 16 which is attached so as to straddle the filter 13. The intake passage 2 and exhaust passage 3 are connected by an EGR passage 17. An EGR valve 18 and an EGR cooler 19 are interposed at points on the EGR passage 17. The exhaust turbocharger 8 comprises a variable nozzle 20 that is capable of adjusting the flow rate of exhaust gas into the turbine 12. A crank angle sensor 21 which detects the rotation speed and crank position of the engine 1 is installed in the engine 1.

A controller 22 is constituted by a microcomputer comprising a CPU and peripheral devices. The controller 22 may be constituted by a plurality of controllers. The controller 22 controls the fuel injection timing, the fuel injection amount, the throttle valve opening, the EGR amount, the opening of the variable nozzle of the exhaust turbine, and so on based on signals from the various sensors described above. The controller 22 also calculates the amount of particulate accumulated in the filter 13, and when the amount of particulate increases, performs oxidation processing of the accumulated particulate by raising the exhaust gas temperature through engine control, thereby restoring the particulate trapping ability of the filter 13 (filter regeneration processing).

Figure 2:
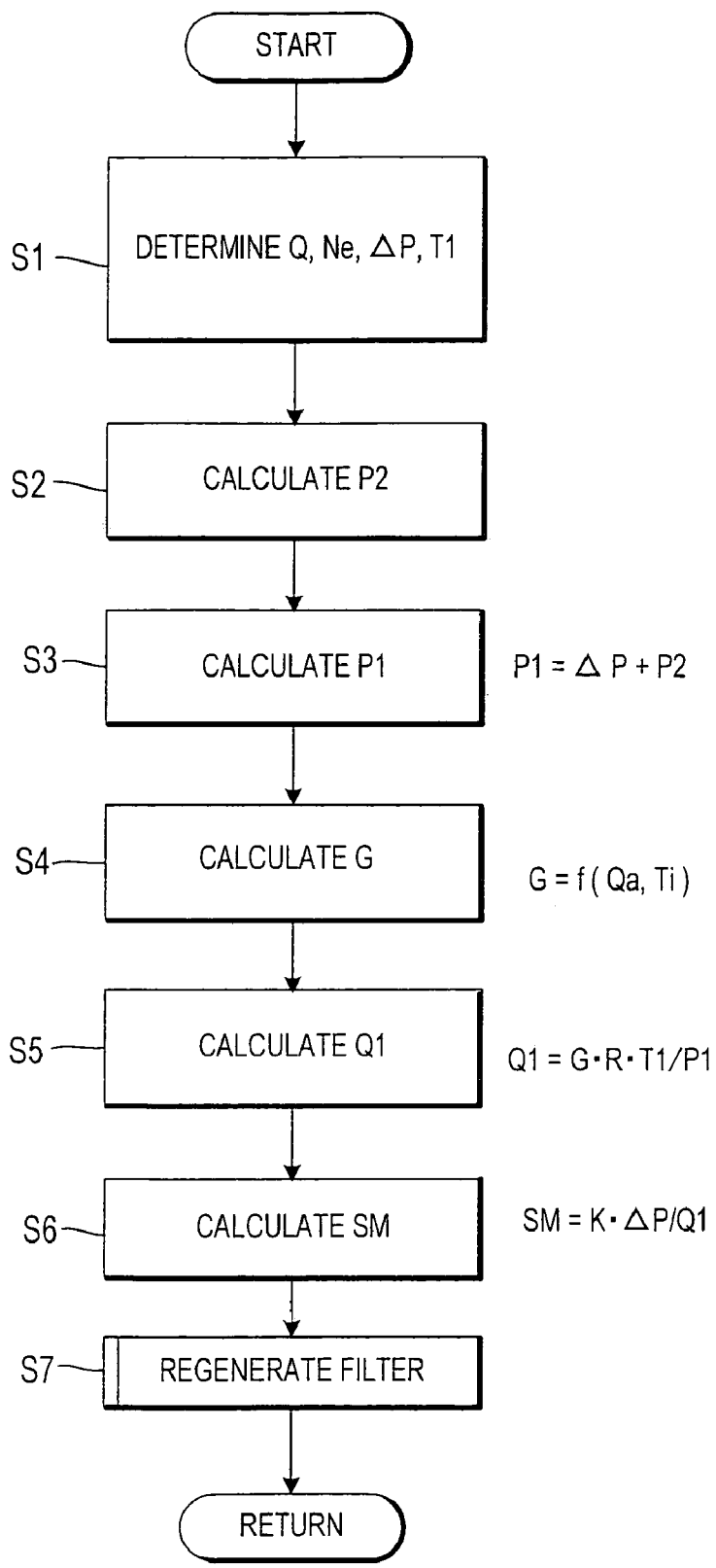
FIG. 2 is a flowchart showing processing executed by a controller to calculate particulate accumulation.

FIG. 2 is a flowchart showing particulate accumulation calculation processing which is executed cyclically by the controller 22 at fixed time intervals.

First, in a step S1, a load Q, a rotation speed Ne, the differential pressure $\Delta P$ of the filter 13, and an exhaust gas temperature T1 at the inlet to the filter 13 are determined as operating conditions of the engine 1. A fuel injection amount command value held by the controller 22, for example, is used as a representative value of the load Q. The operating amount of the accelerator pedal or the opening of the throttle valve 11 may also be used as the load Q. The rotation speed Ne is a value detected by the crank angle sensor 21. The differential pressure $\Delta P$ of the filter 13 and the exhaust gas temperature T1 at the inlet are values detected by the differential pressure sensor 16 and temperature sensor 14 respectively.

Figure 3:
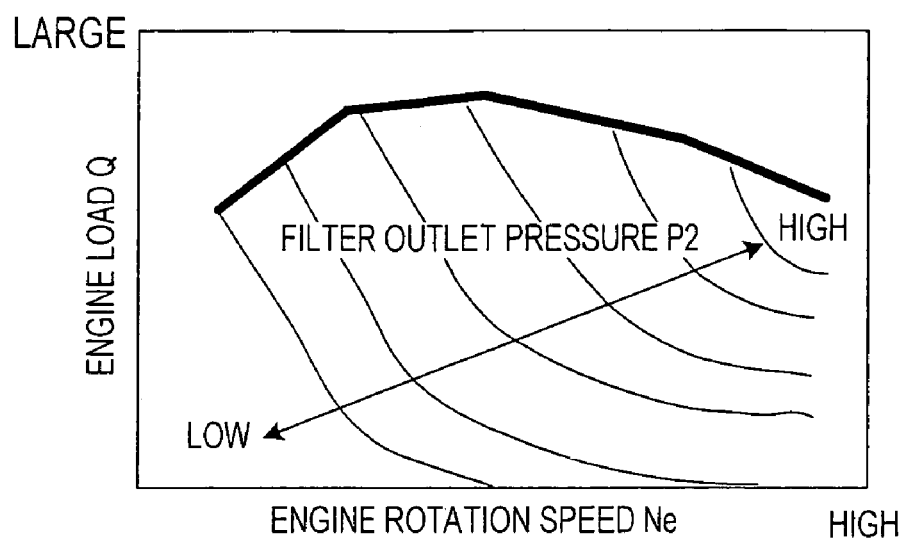
FIG. 3 is a map used in the calculation processing of FIG. 2.

Next, in a step S2, a pressure P2 at the outlet of the filter 13 is calculated on the basis of the load Q and rotation speed Ne of the engine 1 with reference to the map shown in FIG. 3. The map in FIG. 3 defines the relationship of the outlet pressure P2 to the load Q and rotation speed Ne of the engine 1, and is created in advance through experiment. The map accurately reflects the characteristics of the engine 1 and filter 13.

In a step S3, the outlet pressure P2 and differential pressure ΔP are added together to calculate an exhaust gas pressure P1 at the inlet to the filter 13.

In a step S4, an exhaust gas mass flow rate G is determined. The exhaust gas mass flow rate G may be calculated as the sum of an output Qa of the airflow meter 7 and a fuel injection amount command value Ti, for example.

In a step S5, an exhaust gas volumetric flow rate Q1 is calculated according to the following equation (1).

$$Q1 = G \cdot R \cdot T1/P1 \qquad (1)$$

where G: the exhaust gas mass flow rate;
T1: the exhaust gas temperature at the inlet to the filter 13;
R: a gas constant; and
P1: the exhaust gas pressure at the inlet to the filter 13.

Figure 4:
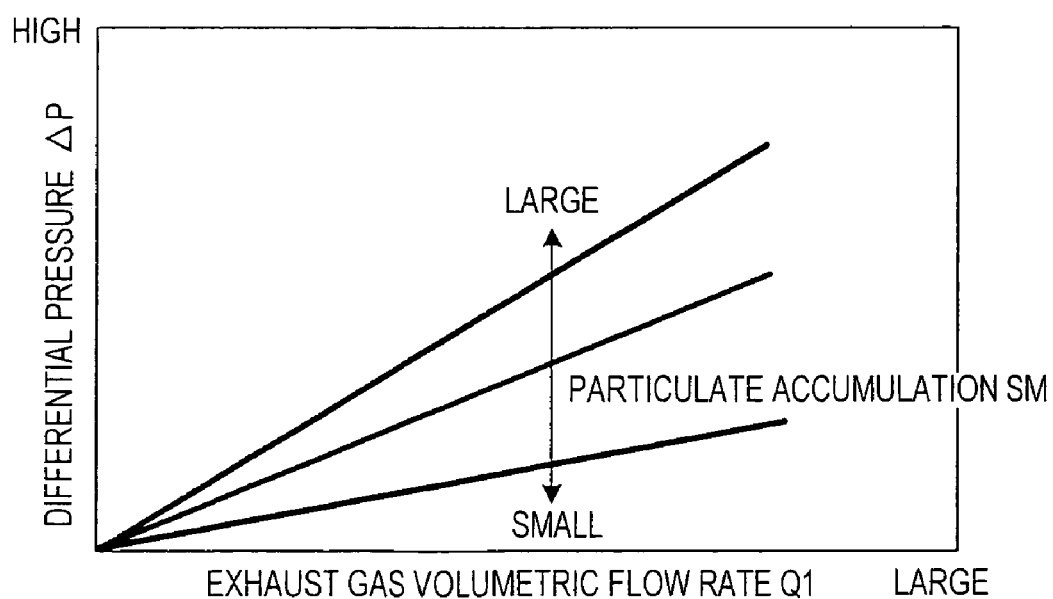
FIG. 4 is a map showing the relationship of particulate accumulation to the differential pressure between the front and rear of a filter and the exhaust gas volumetric flow rate.

In a step S6, the exhaust gas volumetric flow rate Q1 determined as described above and the differential pressure ΔP between the front and rear of the filter 13 are used to calculate an amount SM of particulate accumulated in the filter 13. As shown in FIG. 4, the particulate accumulation SM has a relationship of proportionality to the ratio of the differential pressure ΔP between the front and rear of the filter 13 and the exhaust gas volumetric flow rate Q1. Accordingly, by setting an appropriate coefficient K for the engine system through experiment, the particulate accumulation SM can be determined accurately from the following equation (2).

$$SM = K \cdot \Delta P / Q1 \qquad (2)$$

In a step S7, the calculated particulate accumulation SM is transferred to a filter regeneration routine, whereupon the current processing ends.

In the filter regeneration routine, the exhaust gas temperature in the engine 1 is raised when the particulate accumulation SM exceeds a predetermined reference value, for example, whereupon the particulate is subjected to oxidation processing by a catalytic reaction of the filter 13. In the engine system shown in FIG. 1, at least one of a reduction in the opening of the throttle valve 11, retardation of the fuel injection tiring, execution of a secondary injection, reduction of the EGR amount, or control of the opening of the variable nozzle 20 is implemented, whereby the exhaust gas temperature is raised above the 300° C. that is required for regeneration of the filter 13. The exhaust gas temperature may also be raised by increasing the load of an auxiliary device such as an air compressor or alternator.

A second embodiment of this invention will now be described. The constitution of the engine system in the second embodiment is identical to that shown in FIG. 1 of the first embodiment, but the particulate accumulation calculation performed by the controller 22 is different in the second embodiment.

The exhaust gas pressure P2 at the outlet of the filter 13 during regeneration of the filter 13 sometimes differs from the pressure when regeneration is not underway in accordance with the control of the fuel injection timing, fuel injection amount, variable nozzle opening, and so on as described above. Normally, the absolute value of the outlet pressure P2 falls as the exhaust gas flow decreases. If the particulate accumulation calculation shown in FIG. 2 is performed during filter regeneration under these conditions, and the exhaust gas pressure P2 at the outlet of the filter 13 is calculated with reference to the map shown in FIG. 3, an error will occur.

Hence in the second embodiment, a map for use during filter regeneration and a map for use when filter regeneration is not underway are prepared separately as maps for calculating the outlet pressure P2, and thus by using these maps selectively, the particulate accumulation can be determined accurately regardless of the state of filter regeneration.

Figure 5:
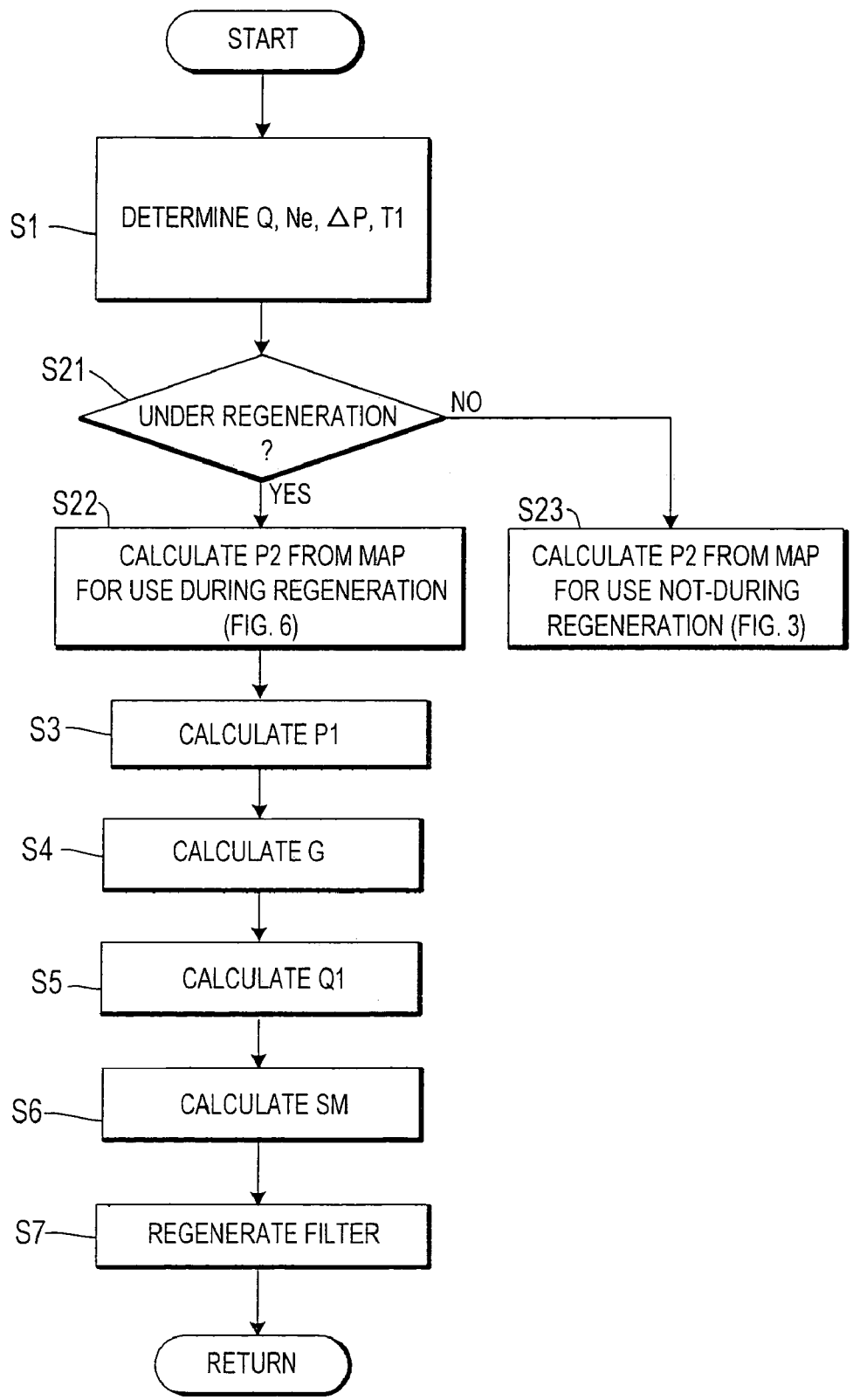
FIG. 5 shows another example of processing to calculate particulate accumulation in a second embodiment of this invention.

A calculation processing flowchart is shown in FIG. 5. This flowchart is similar to the flowchart in FIG. 2, but differs in that the processing of the step S2 for calculating the outlet pressure P2 is replaced with steps S21–S23.

Figure 6:
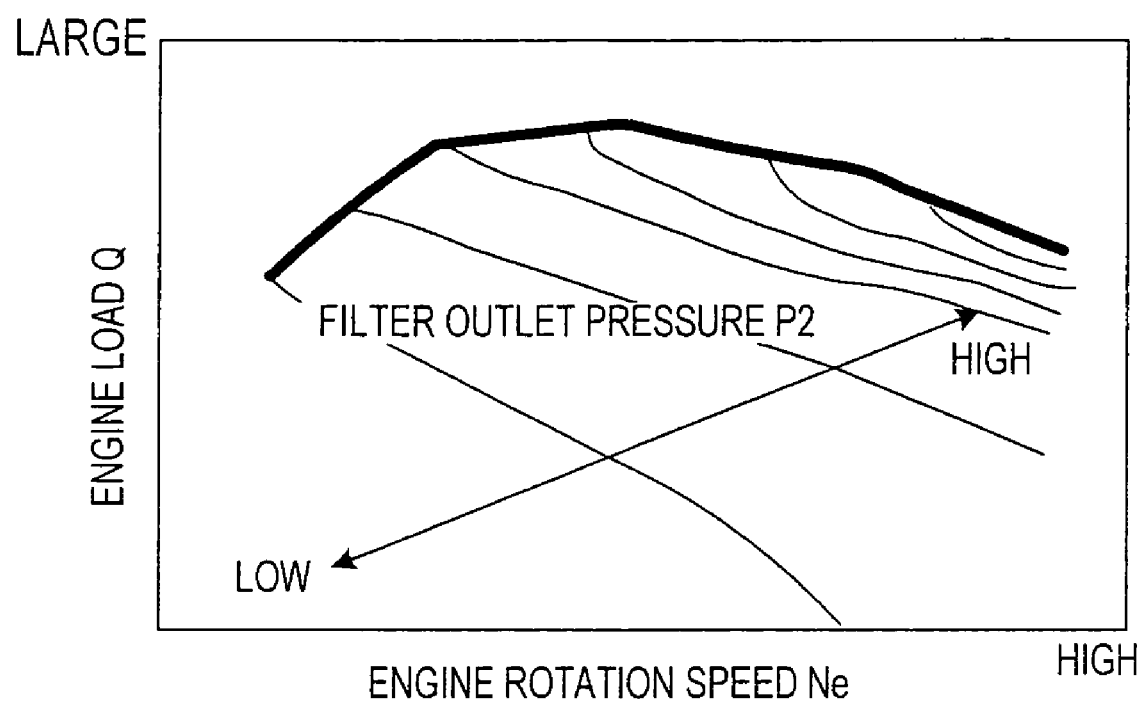
FIG. 6 is a map used in the calculation processing of FIG. 5.

In the step S21, a determination is made as to whether or not the filter 13 is under regeneration, and if so, the process advances to the step S22, where the outlet pressure P2 is calculated with reference to the map for use during regeneration (FIG. 6). If it is determined in the step S21 that regeneration is not underway, the process advances to the step S23, where the outlet pressure P2 is calculated with reference to the map for use when regeneration is not underway (FIG. 3). The subsequent processing is identical to that of FIG. 2.

As described above, this invention determines the exhaust gas pressure at the filter outlet in accordance with the engine operating conditions, and determines the exhaust gas pressure at the inlet to the filter from the filter outlet pressure and the differential pressure between the front and rear of the filter. The inlet pressure determined in this manner is used to determine particulate accumulation, and thus the particulate accumulation, which is required to determine the need for filter regeneration, can be calculated accurately.

The filter outlet pressure may be determined by referring to a map which is set in advance experientially in accordance with the characteristics of the engine and filter, for example. The filter inlet pressure can be determined with a high degree of precision from the differential pressure between the front and rear of the filter and the filter outlet pressure obtained with reference to the map. Further, the outlet pressure is less likely to be affected by particulate accumulation than the inlet pressure. Hence the exhaust gas volumetric flow rate, which is required to determine particulate accumulation accurately, can also be calculated with a high degree of precision. As a result, the timing of filter regeneration can be determined more accurately. Furthermore, since the front and rear filter pressure values are determined by a single differential pressure sensor rather than providing respective pressure sensors for detecting the pressure at the front and the rear of the filter, the constitution of the device is simplified.

The entire contents of Japanese Patent Application P2003-61585 (filed Mar. 7, 2003) are incorporated herein by reference.

Although the invention has been described above by reference to a certain embodiment of the invention, the invention is not limited to the embodiment described above. Modifications and variations of the embodiments described above will occur to those skilled in the art, in the light of the above teachings. The scope of the invention is defined with reference to the following claims.

What is claimed is:

1. An exhaust gas purification device having a filter which traps exhaust particulate from an engine, comprising:
   a detection device which detects a differential pressure between the front and rear of the filter; and
   a controller functioning to:
   determine an operating condition of the engine;
   calculate an exhaust gas pressure at an outlet of the filter based on the operating condition of the engine;
   calculate an exhaust gas pressure at an inlet to the filter based on the differential pressure and outlet pressure;

calculate an exhaust gas volumetric flow rate based on the inlet pressure; and calculate an amount of particulate accumulated in the filter based on the exhaust gas volumetric flow rate.

2. The exhaust gas purification device as defined in claim 1, wherein the controller further functions to perform regeneration of the filter in accordance with the particulate accumulation.

3. The exhaust gas purification device as defined in claim 1, further comprising a map which defines a relationship between the outlet pressure of the filter and the operating condition of the engine, wherein the controller further functions to calculate the outlet pressure of the filter by referring to the map.

4. The exhaust gas purification device as defined in claim 3, wherein the map defines the relationship of the outlet pressure of the filter to a rotation speed and a load of the engine.

5. The exhaust gas purification device as defined in claim 1, comprising:

a first map which defines the relationship between the outlet pressure of the filter when filter regeneration is not underway and the operating condition of the engine; and a second map which defines the relationship between the outlet pressure of the filter during filter regeneration and the operating condition of the engine, wherein the controller further functions to:

determine whether regeneration of the filter is underway;

select the first map or second map according to whether regeneration of the filter is underway; and calculate the outlet pressure of the filter by referring to the selected map.

6. The exhaust gas purification device as defined in claim 5, wherein the first and second maps define the relationship of the outlet pressure of the filter to the rotation speed and load of the engine.

7. The exhaust gas purification device as defined in claim 1, wherein the controller further functions to calculate the exhaust gas volumetric flow rate according to the following equation, $$Q1 = G \cdot R \cdot T1/P1$$

where $Q1$: the exhaust gas volumetric flow rate;

$G$: an exhaust gas mass flow rate determined from an airflow meter output and a fuel injection amount;

$T1$: an exhaust gas temperature at the inlet to the filter;

$R$: a gas constant; and $P1$: the inlet pressure of the filter.

8. The exhaust gas purification device as defined in claim 2, wherein the controller further functions to raise the exhaust gas temperature of the engine by executing at least one of fuel injection timing control, fuel injection amount control, nozzle opening control of a variable nozzle exhaust turbocharger, EGR control, intake air amount control, and auxiliary device load control, and thereby regenerates the filter.

9. A method for determining an amount of particulate accumulated in a filter which traps exhaust particulate from an engine, comprising:

determining an operating condition of the engine;

determining a differential pressure between the front and rear of the filter;

calculating an exhaust gas pressure at an outlet of the filter based on the operating condition of the engine;

calculating an exhaust gas pressure at an inlet to the filter based on the differential pressure and the outlet pressure;

calculating an exhaust gas volumetric flow rate based on the inlet pressure; and calculating the amount of particulate accumulated in the filter based on the exhaust gas volumetric flow rate.

10. A filter regeneration method for performing regeneration of a filter in accordance with the particulate accumulation in the filter which is calculated according to the method defined in claim 9.

11. An exhaust gas purification device having a filter which traps exhaust particulate from an engine, comprising:

means for detecting a differential pressure between the front and rear of the filter;

means for determining an operating condition of the engine;

means for calculating an exhaust gas pressure at an outlet of the filter based on the operating condition of the engine;

means for calculating an exhaust gas pressure at an inlet to the filter based on the differential pressure and outlet pressure;

means for calculating an exhaust gas volumetric flow rate based on the inlet pressure; and means for calculating an amount of particulate accumulated in the filter based on the exhaust gas volumetric flow rate.

* * * * *